A. H. TAFT.
SHOE TREE.
APPLICATION FILED NOV. 14, 1908.
938,615.
Patented Nov. 2, 1909.
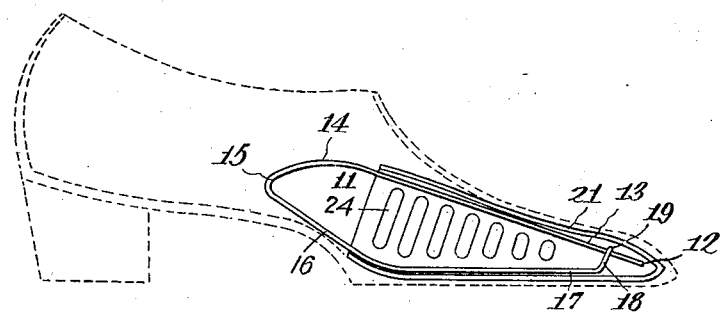
Fig. 1.
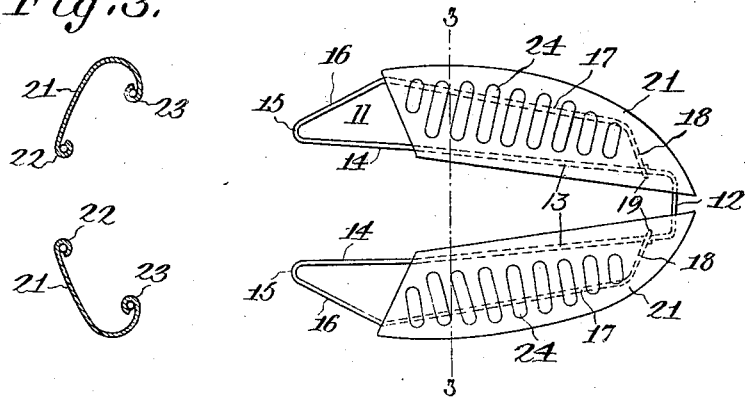
Fig. 3.
Fig. 2.
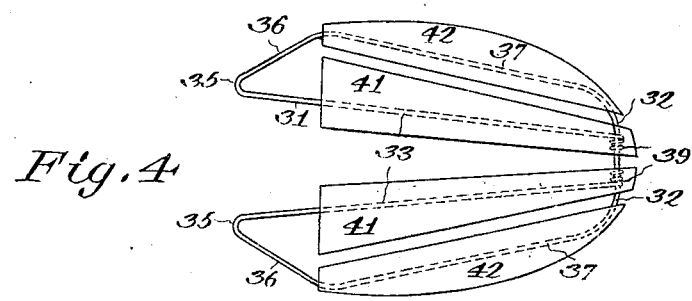
Fig. 4.
Witnesses:
Bessie M. Tolhurst
Anna J. Sheeran
Augustus H. Taft
Inventor:
by Geo. C. Cooper
Atty.

UNITED STATES PATENT OFFICE.

AUGUSTUS H. TAFT, OF TROY, NEW YORK.

SHOE-TREE.

938,615.  Specification of Letters Patent.  Patented Nov. 2, 1909.

Application filed November 14, 1908. Serial No. 462,690.

*To all whom it may concern:*

Be it known that I, AUGUSTUS H. TAFT, a citizen of the United States, and a resident of Troy, New York, have invented a new and useful Improvement in Shoe-Trees, of which the following is a specification.

My invention relates to detachable shoe trees such as are adapted to be slipped into the shoe when it is not in use to preserve its shape, and particularly to prevent wrinkling of the vamp. It is intended to produce a tree which shall be light, economical and durable, easily inserted and removed, adapted to shoes of different sizes and shapes, and preferably ventilated, so as not to interfere with the drying of the shoe.

It consists of side portions connected together, such connection or the side portions themselves, or both, being resilient, so that the forward part of the shoe is pressed outwardly to prevent its wrinkling. By reason of this resiliency the tree adapts itself to shoes of different sizes and shapes; and is, in addition, enabled to maintain itself in position and to perform its function without having any rearward extension bearing against the counter of the shoe.

In the drawings, Figure 1 is a longitudinal vertical section of a tree embodying my invention, in its operative position in a shoe; Fig. 2 is a top plan view of the tree; Fig. 3 is a partial cross section on the plane 3—3, Fig. 2; Fig. 4 is a top plan view of a modified form of the device.

Referring to the first three figures, 11 designates a frame or skeleton, shown as consisting of an integral piece of resilient wire bent at its middle to form a transverse connection 12, from which parts 13 extend rearwardly, outwardly and upwardly each to a downwardly curved part 14, united by an acutely bent part 15 to a downwardly and outwardly extending part 16, from which a part 17 extends forwardly and inwardly to a part 18, which extends upwardly and inwardly and terminates in an eye 19 embracing the part 13 near its forward end. To each side of this bilateral frame 11 is secured a plate 21, which may advantageously be of sheet metal, and which is curved to conform to the forward portion or vamp of a shoe. The plates 21 may be secured to the frame 11 in any desired manner, preferably by rolling their edges 22, 23 around the straight members 13 and 17 of the frame, as indicated in Fig. 3. To make it easier to shape the plates 21 to the desired contour, and at the same time to make them more resilient, I preferably pierce them with a number of foraminations, shown as transverse slots 24. These serve the additional function of facilitating the drying out of the shoe, if it be wet when the tree is put in.

The operation of the device will be readily understood from an inspection of the drawings. It will be seen that the members 14, 15, 16 of the frame 11, which extend rearwardly of the plates 21, form convenient handles, which may be gripped between the finger and thumb so as to draw the side portions of the tree toward each other, so that it may be easily slipped and forced forward into the toe of the shoe. Its outward expansion, together with the upward pressure of the members 13, cause it to press strongly outward on the vamp of the shoe, thus effectually preventing wrinkling. Being held in place by its own resiliency, it requires no rearward extension, bearing against the counter of the shoe, to either force or hold it forward. By pinching together the handle portions, it is easily removed. By moving these handles toward or from each other with sufficient force to slightly distort the front member 12 of the frame, the tree may be adapted to exert any desired pressure on shoes of different widths.

In the form of the device shown in Fig. 4, the frame 31, made as before from an integral piece of wire, consists of a curved forward connecting part or member 32, from each end of which leads a rearwardly and outwardly extending member 37, which joins an inwardly and upwardly extending part 36, connected by an acute bend 35 to a straight member 33, the forward end 39 of which is coiled around the middle of the part 32. To each of the members 33 and 37 on each side of the bilateral frame thus formed is secured a curved plate, marked 41, 42, separated by a narrow space, each two plates 41, 42 together having a contour substantially like that of a plate 21 in the former construction, so that the tree conforms as before to the vamp of the shoe. Obviously, the mode of operation and the function of this form of my device is similar to that of the construction first described, except that the outward pressure against the vamp may be largely or entirely due to the upwardly exerted force of the resilient members 33 of the wire frame, acting through the plates 41.

It will be understood that my invention may be embodied in many different forms other than those shown. I do not, therefore, limit it to these forms, or otherwise except as set forth in the claims.

What I claim is:

1. A shoe tree comprising side portions resiliently connected together and normally springing apart, each of said side portions including a wire frame portion and a plurality of resilient curved plates secured to and substantially covering said frame portion, said plates being adapted by their resiliency to conform to and press outwardly against the vamp of a shoe in which the tree is inserted.

2. A shoe tree comprising side portions resiliently connected together and normally springing apart, each of said sides including a wire frame portion and a resilient transversely slotted plate secured to and substantially covering said frame portion, said plates being adapted to conform to and press outwardly against the vamp of a shoe in which the tree is inserted.

AUGUSTUS H. TAFT.

Witnesses:
 GEO. L. COOPER,
 WM. S. GREER.